(12) United States Patent
Yoshida et al.

(10) Patent No.: US 11,085,365 B2
(45) Date of Patent: Aug. 10, 2021

(54) PREVENTION OF PERFORMANCE FALSIFICATION OF A TURBOCHARGER

(71) Applicant: IHI Corporation, Tokyo (JP)

(72) Inventors: Yoshinari Yoshida, Tokyo (JP); Masaru Nishioka, Tokyo (JP); Nobuaki Sugiu, Tokyo (JP); Ikuma Nishiguchi, Tokyo (JP); Satoru Furuta, Tokyo (JP)

(*) Notice: Subject to any disclaimer, the term of this patent is extended or adjusted under 35 U.S.C. 154(b) by 0 days.

(21) Appl. No.: 17/131,918

(22) Filed: Dec. 23, 2020

(65) Prior Publication Data
US 2021/0108557 A1 Apr. 15, 2021

Related U.S. Application Data

(63) Continuation of application No. PCT/JP2019/010957, filed on Mar. 15, 2019.

(30) Foreign Application Priority Data

Jul. 10, 2018 (JP) ............... JP2018-130922

(51) Int. Cl.
  *F02B 37/18* (2006.01)
  *F16B 41/00* (2006.01)
(52) U.S. Cl.
  CPC ............ *F02B 37/18* (2013.01); *F16B 41/005* (2013.01)
(58) Field of Classification Search
  CPC ........ F02B 37/18; F16B 41/005; F16B 41/00; Y02T 10/12
  See application file for complete search history.

(56) References Cited

U.S. PATENT DOCUMENTS

| 4,271,095 A | 6/1981 | Maeda |
| 5,924,401 A | 7/1999 | Maier et al. |
| 2010/0089055 A1* | 4/2010 | Severin ............. F16C 7/06 60/602 |
| 2017/0370397 A1 | 12/2017 | Oso et al. |

FOREIGN PATENT DOCUMENTS

| JP | S55-030974 | 2/1980 |
| JP | S57-171132 | 10/1982 |
| JP | S58-162726 | 9/1983 |
| JP | H5-108169 | 4/1993 |

(Continued)

OTHER PUBLICATIONS

International Search Report dated May 7, 2019 for PCT/JP2019/010957.

(Continued)

*Primary Examiner* — Audrey K Bradley
*Assistant Examiner* — Edward Bushard
(74) *Attorney, Agent, or Firm* — Soei Patent & Law Firm

(57) ABSTRACT

A falsification prevention structure is to prevent falsification of the performance of a turbocharger. A bearing housing of the turbocharger has a flow rate adjustment screw which is operated to adjust a turbine flow rate of the turbocharger. The falsification prevention structure includes a cover member which is fastened to a flange portion of the bearing housing by a fixing bolt and which covers the flow rate adjustment screw, and a cap which is mounted in an irremovable manner with respect to the cover member and which blocks a bolt hole.

20 Claims, 10 Drawing Sheets

(56) References Cited

FOREIGN PATENT DOCUMENTS

| | | |
|---|---|---|
| JP | H7-025242 | 5/1995 |
| JP | H11-101217 | 4/1999 |
| JP | H11-509909 | 8/1999 |
| JP | H11-315823 | 11/1999 |
| JP | 2005-226668 | 8/2005 |
| JP | 2008-064299 | 3/2008 |
| JP | 2009-180289 | 8/2009 |
| JP | 2013-007265 | 1/2013 |
| JP | 2014-181589 | 9/2014 |
| JP | 2017-227311 | 12/2017 |

OTHER PUBLICATIONS

International Preliminary Report on Patentability with Written Opinion dated Jan. 21, 2021 for PCT/JP2019/010957.

* cited by examiner

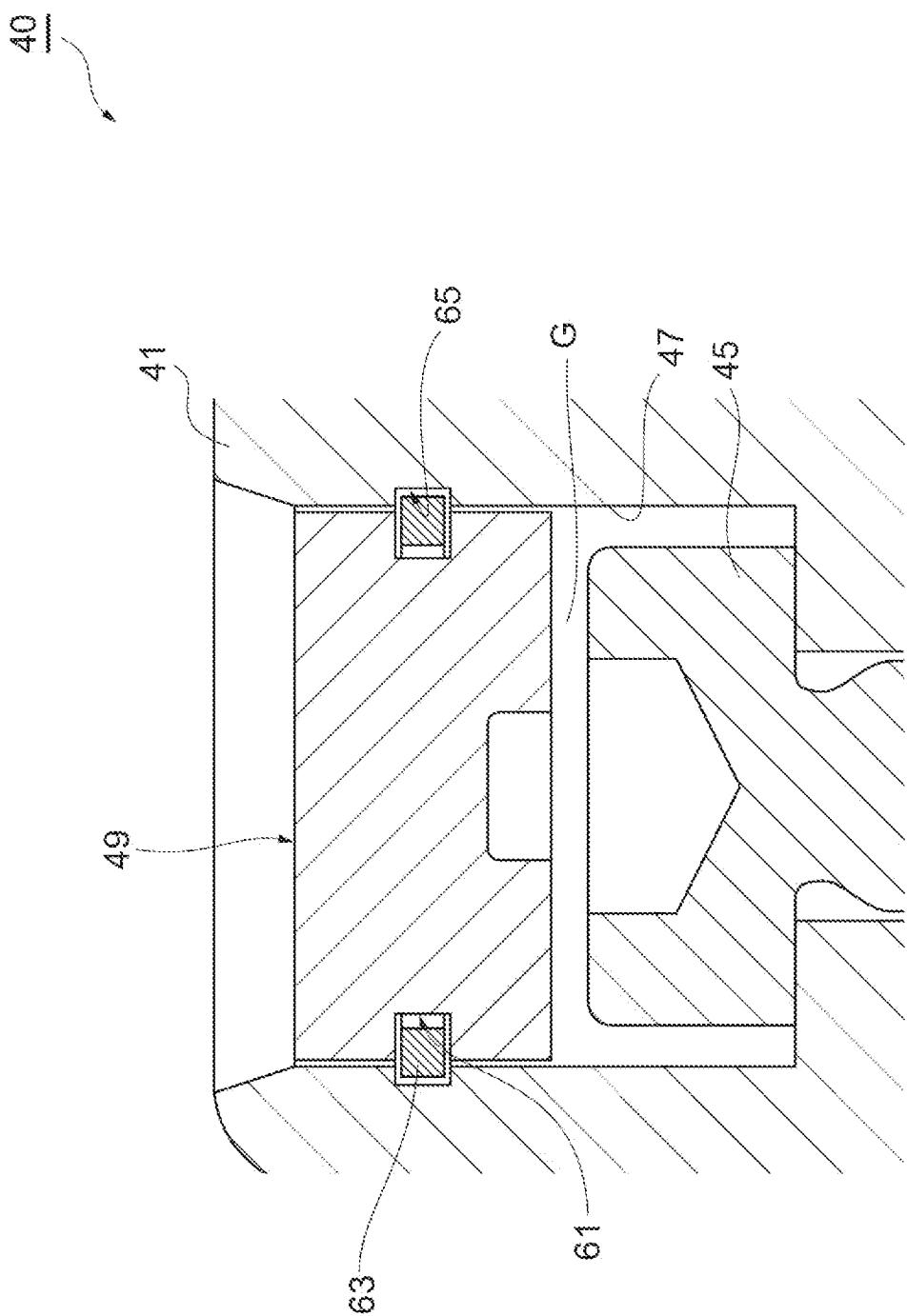

PREVENTION OF PERFORMANCE FALSIFICATION OF A TURBOCHARGER

CROSS-REFERENCE TO RELATED APPLICATION

This application is a continuation application of PCT Application No. PCT/JP2019/010957, filed Mar. 15, 2019, the entire contents of which are incorporated herein by reference.

BACKGROUND

As a conventional turbocharger, examples described in Japanese Unexamined Utility Model Publication No. H7-25242, Japanese Unexamined Patent Publication No. H11-315823, No. 2008-064299 and No. 2009-180289 are known. In the turbocharger described in Japanese Unexamined Patent Publication No. H7-25242, a lever is mounted on a valve shaft of an exhaust control valve, and a rod of an actuator is mounted on the lever, and thus the valve shaft is driven by the actuator.

In addition, an adjustment screw which serves as a stopper for the lever is provided. A range of motion of the lever is set with an operation of the adjustment screw, and a degree of opening on the fully closed side of the valve can be adjusted.

SUMMARY

However, there are cases in which this kind of performance adjustment can be performed only by a predetermined authorized person (for example, a manufacturer of a turbocharger). Additionally, when the performances of the turbocharger are falsified by a person other than the authorized person (for example, a user), exhaust gas characteristics may be affected. Therefore, measures to prevent the above-described falsification may be required by various laws and regulations, or the like. In view of such a situation, the current disclosure describes a falsification prevention structure for preventing falsification of the performances of a turbocharger.

A falsification prevention structure according to an aspect of the current disclosure is a falsification prevention structure for preventing falsification of performances of a turbocharger, wherein a main body of the turbocharger includes an adjustment operation portion operated to adjust the performances of the turbocharger, and also includes a cover member which is fastened to the main body by a fastening member and covers the adjustment operation portion, and a lid member which is mounted on the cover member in an irremovable manner (tamper-proof manner) and blocks a fastening hole in which the fastening member is mounted.

According to the falsification prevention structure of the current disclosure, it is possible to prevent falsification of the performances of a turbocharger.

BRIEF DESCRIPTION OF DRAWINGS

FIG. 7 is a cross-sectional view showing a hypothetical bolt hole and a cap.

DETAILED DESCRIPTION

A falsification prevention structure according to an aspect of the current disclosure is a falsification prevention structure for preventing falsification of performances of a turbocharger, wherein a main body of the turbocharger includes an adjustment operation portion operated to adjust the performances of the turbocharger, and also includes a cover member which is fastened to the main body by a fastening member and covers the adjustment operation portion, and a lid member which is mounted on the cover member in an irremovable manner and blocks a fastening hole in which the fastening member is mounted.

The lid member may be rotatably mounted on the cover member. The adjustment operation portion may be a portion which receives a rotation operation of the performance adjustment screw for adjusting the performances. The lid member may be disposed with a gap from the fastening member. The lid member may be made of a material which has been subjected to a hardening treatment.

At least a part of the lid member may be inserted into the fastening hole in an axial direction, a ring mounting groove which extends in a circumferential direction and in which a retaining ring is mounted may be formed in the lid member, and a ring fitting groove into which the retaining ring is fitted may be formed in an inner wall of the fastening hole.

The fastening hole may have a large-diameter hole located on an inlet side into which the fastening member is inserted, a small-diameter hole portion located on an inner side from the large-diameter hole portion and formed to have a smaller diameter than the large-diameter hole portion, and a ring fitting groove formed at a boundary between the large-diameter hole portion and the small-diameter hole portion, and the lid member may have a large-diameter body portion inserted into the large-diameter hole portion, a small-diameter body formed to have a smaller diameter than the large-diameter body portion and inserted into the small-diameter hole portion, and a ring mounting groove formed at a boundary between the large-diameter body portion and the small-diameter body portion.

Figure 1:
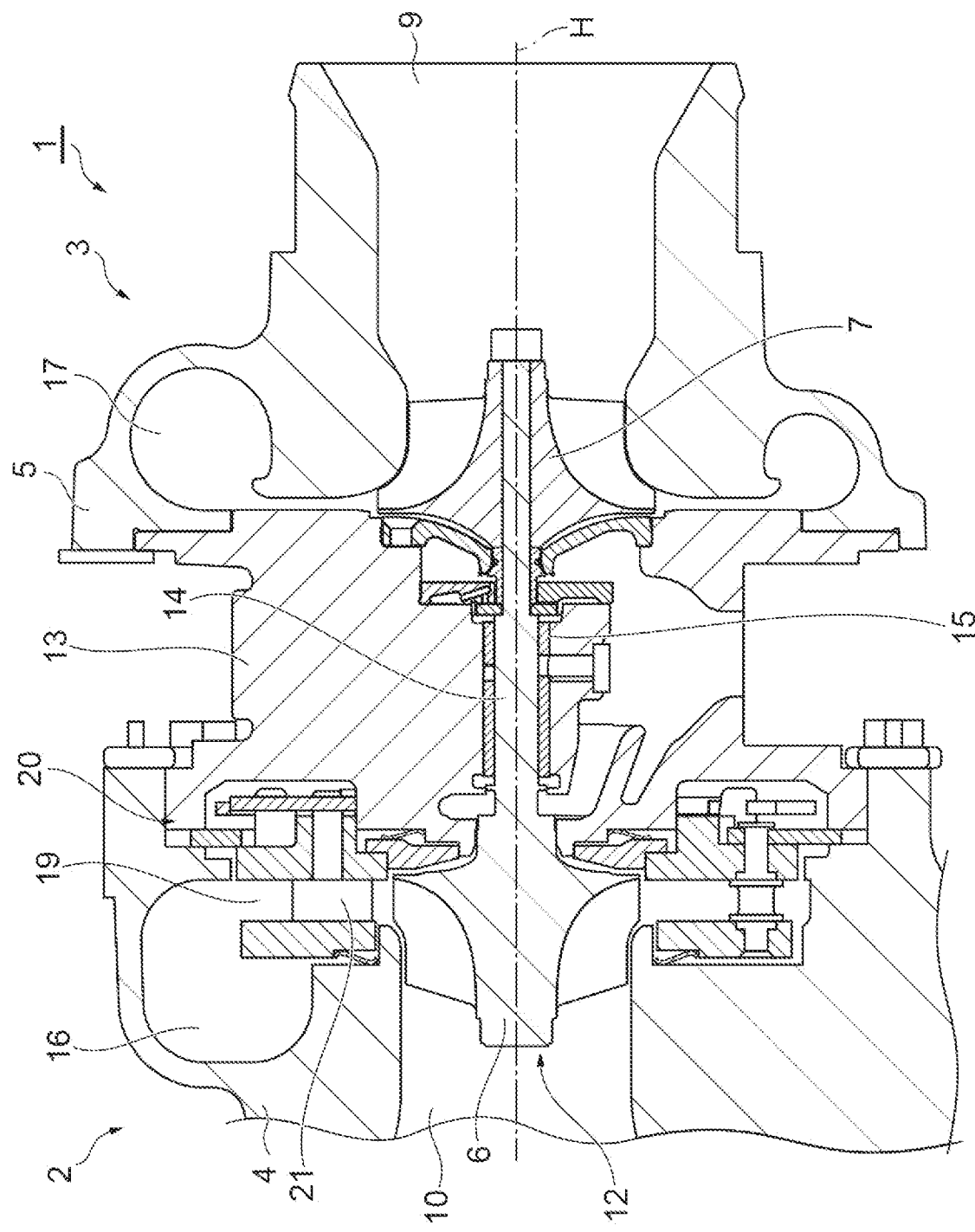
FIG. 1 is a cross-sectional view of a turbocharger with a falsification prevention structure according to an example.

The falsification prevention structure according to the example will be described with reference to the drawings. FIG. 1 is a cross-sectional view along a section including a rotation axis H of a turbocharger 1. The turbocharger 1 is a variable capacity turbocharger having a falsification prevention structure according to the example.

The turbocharger 1 is mainly applied to an internal combustion engine of a vehicle. As shown in FIG. 1, the turbocharger 1 includes a turbine 2 and a compressor 3. The turbine 2 includes a turbine housing 4 and a turbine impeller 6 accommodated in the turbine housing 4. The turbine housing 4 has a scroll passage 16 which extends in a circumferential direction around the turbine impeller 6. The compressor 3 includes a compressor housing 5 and a compressor impeller 7 accommodated in the compressor housing 5. The compressor housing 5 has a scroll passage 17 which extends in a circumferential direction around the compressor impeller 7.

The turbine impeller 6 is provided at one end of a rotating shaft 14, and the compressor impeller 7 is provided at the other end of the rotating shaft 14. A bearing housing 13 is provided between the turbine housing 4 and the compressor housing 5. The rotating shaft 14 is rotatably supported by the bearing housing 13 via a bearing 15, and the rotating shaft 14, the turbine impeller 6 and the compressor impeller 7 rotate around the rotation axis H as an integral rotating body 12.

An exhaust gas inlet (not shown) and an exhaust gas outlet 10 are provided in the turbine housing 4. Exhaust gas discharged from an internal combustion engine (not shown) flows into the turbine housing 4 through the exhaust gas inlet, flows into the turbine impeller 6 through the scroll passage 16, and rotates the turbine impeller 6. After that, the exhaust gas flows out of the turbine housing 4 through the exhaust gas outlet 10.

A suction port 9 and a discharge port (not shown) are provided in the compressor housing 5. When the turbine impeller 6 rotates as described above, the compressor impeller 7 rotates via the rotating shaft 14. The rotating compressor impeller 7 suctions external air through the suction port 9. The air passes through the compressor impeller 7 and the scroll passage 17, is compressed, and is discharged from the discharge port. The compressed air discharged from the discharge port is supplied to the above-described internal combustion engine.

In the turbine 2 of the turbocharger 1, movable nozzle vanes 21 are provided in a gas inlet passage 19 which connects the scroll passage 16 to the turbine impeller 6. The plurality of nozzle vanes 21 are disposed at equal intervals on the circumference centered on the rotation axis H. Each of the nozzle vanes 21 rotates around an axis parallel to the rotation axis H. A cross-sectional area of a gas passage of the turbine 2 is adjusted, and the turbine flow rate is adjusted by rotating the plurality of nozzle vanes 21 as described above. In order to drive the nozzle vanes 21 as described above, the turbocharger 1 includes a variable capacity mechanism 20. The variable capacity mechanism 20 is mounted between the turbine housing 4 and the bearing housing 13.

Figure 2:
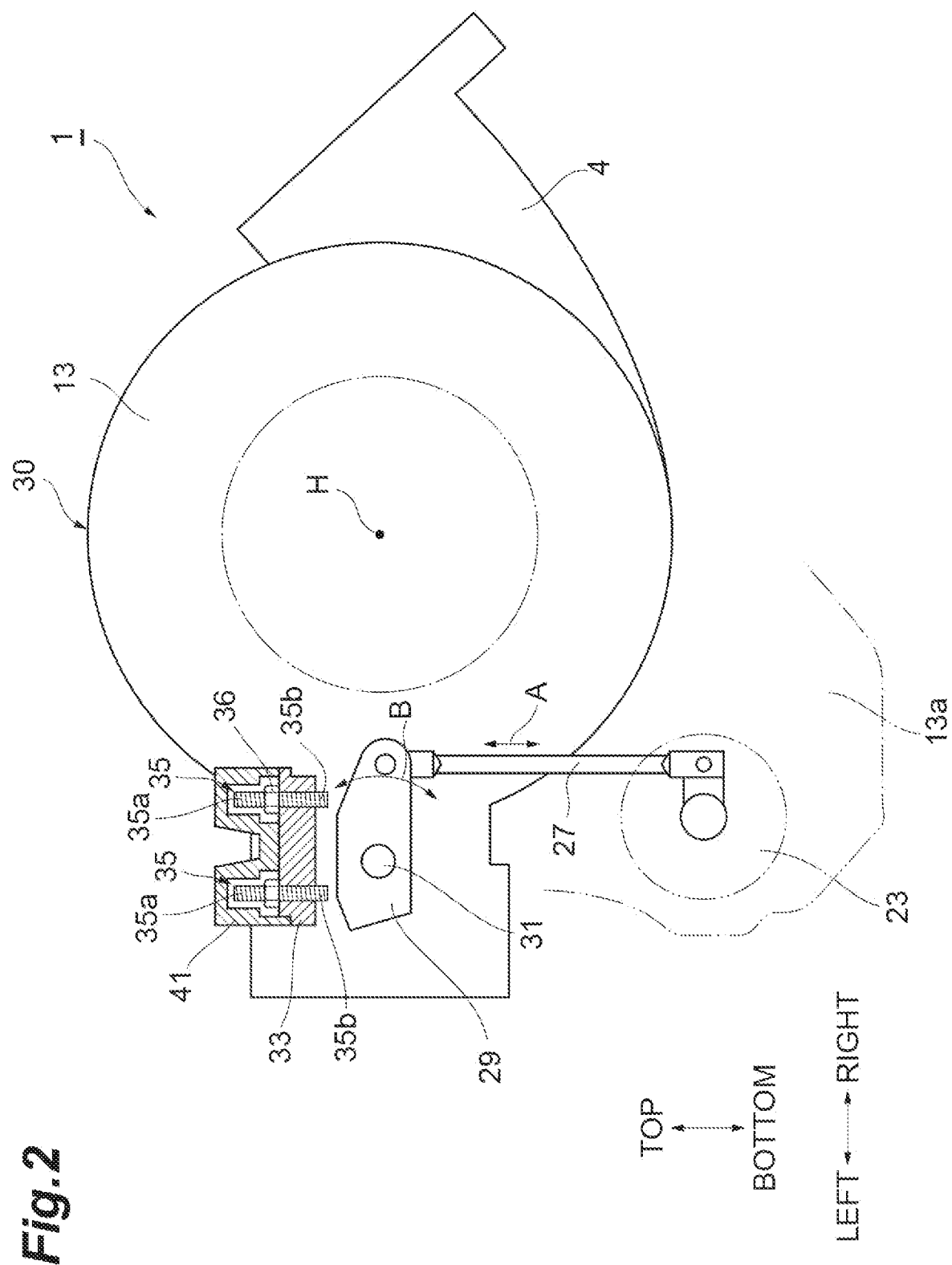
FIG. 2 is a view schematically showing a turbine flow rate adjustment mechanism of the turbocharger.

A transmission mechanism for transmitting a driving force to the variable capacity mechanism 20 will be described with reference to FIG. 2. FIG. 2 is a view schematically showing a vicinity of the transmission mechanism from the compressor 3 side with a line of sight parallel to the rotation axis H. When terms such as "top," "bottom," "left," and "right" are used in the following description, they correspond to the top, bottom, left, and right of the turbocharger 1 in the state shown in FIG. 2.

As shown in FIG. 2, the turbocharger 1 includes an actuator 23. The actuator 23 is a drive source which rotates the nozzle vanes 21 (FIG. 1). The actuator 23 is mounted on the bearing housing 13 via, for example, a bracket 13*a*. The actuator 23 is connected to an input shaft 31 via a rod 27 and a lever 29. The input shaft 31 is connected to the variable capacity mechanism 20 (FIG. 1), and the driving force from the actuator 23 is transmitted to the variable capacity mechanism 20. The rod 27 and the lever 29 are disposed outside the bearing housing 13, and the input shaft 31 passes through the bearing housing 13 and extends parallel to the rotation axis H. When the actuator 23 moves the rod 27 forward and backward as indicated by an arrow A, the lever 29 and the input shaft 31 rotate around the input shaft 31 as indicated by an arrow B. Then, rotation of the input shaft 31 is converted into rotation of the plurality of nozzle vanes 21 by the variable capacity mechanism 20.

Figure 3:
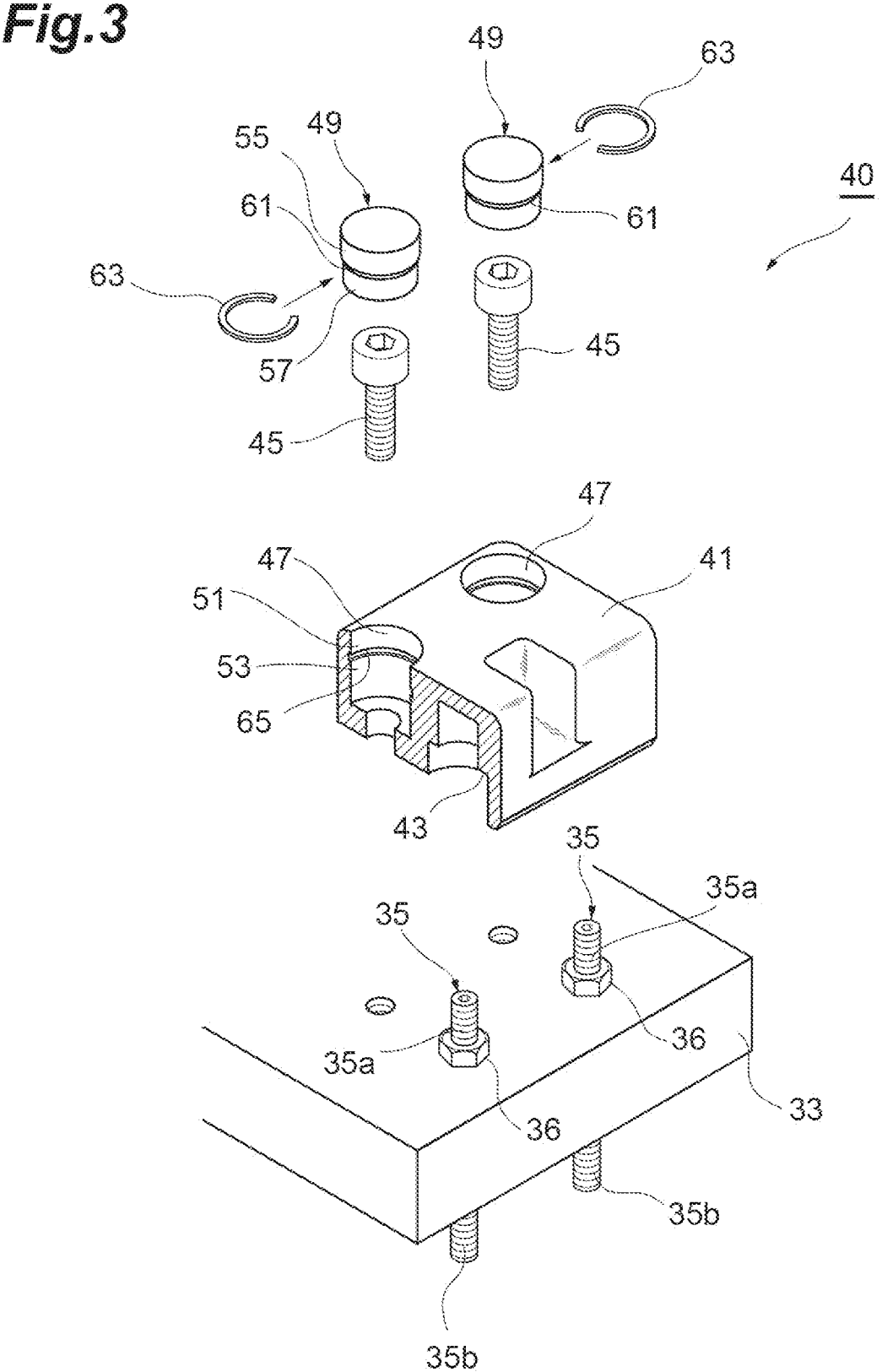
FIG. 3 is a partially cutaway perspective view showing the falsification prevention structure of the example.

As shown in FIGS. 2 and 3, a flange portion 33 is formed as a part of the main body 30 of the turbocharger 1. The flange portion 33 is formed to protrude from an outer surface of the bearing housing 13. Two flow rate adjustment screws 35 (performance adjustment screws) are screwed into the flange portion 33 to pass therethrough vertically. A portion of the flow rate adjustment screw 35 which protrudes upward from the flange portion 33 is referred to as an adjustment screw upper portion 35*a*, and a portion thereof which protrudes downward from the flange portion 33 is referred to as an adjustment screw lower portion 35*b*. When the lever 29 rotates, the rotation of the lever 29 is restricted by an upper edge of the lever 29 colliding with a lower end of the flow rate adjustment screw 35. The flow rate adjustment screw 35 located on the left side of the input shaft 31 restricts clockwise rotation of the lever 29, and the flow rate adjustment screw 35 located on the right side of the input shaft 31 restricts counterclockwise rotation of the lever 29. With such a flow rate adjustment screw 35, a rotation range of the lever 29 and the input shaft 31 is set, and also a turbine flow rate (a performance of the turbocharger) when the nozzle vane 21 is fully closed and fully opened is set.

Further, the turbine flow rate as described above can be adjusted by setting a tool on the adjustment screw upper portion 35*a* (an adjustment operation portion, adjuster) and rotating the flow rate adjustment screw 35. That is, a protruding length of the adjustment screw lower portion 35*b* is changed with a rotation operation of the flow rate adjustment screw 35. Thus, the rotation range of the lever 29 and the input shaft 31 changes. Thus, the turbine flow rate when the nozzle vane 21 is fully closed and fully opened changes. The flow rate adjustment screw 35 is, for example, a set screw (fixing screw), and a tool hole for inserting a tool is formed in the adjustment screw upper portion 35*a*. After the protruding length of the adjustment screw lower portion 35*b* is adjusted, the flow rate adjustment screw 35 is prevented from being loosened by the adjustment screw upper portion 35*a* being fastened on an upper surface of the flange portion 33 with a nut 36.

The adjustment of the turbine flow rate as described above should be performed only by a predetermined authorized person (for example, a manufacturer of the turbocharger). When the above adjustment is possible for a person other than the authorized person (for example, a user), the turbine flow rate may be falsified. Therefore, to prevent the turbine flow rate from being falsified by the user or the like, it is necessary to prevent the user or the like from easily accessing the adjustment screw upper portion 35*a*. Therefore, a falsification prevention structure (a tamper resistance structure) which will be described below is provided in the turbocharger 1.

Figure 4:
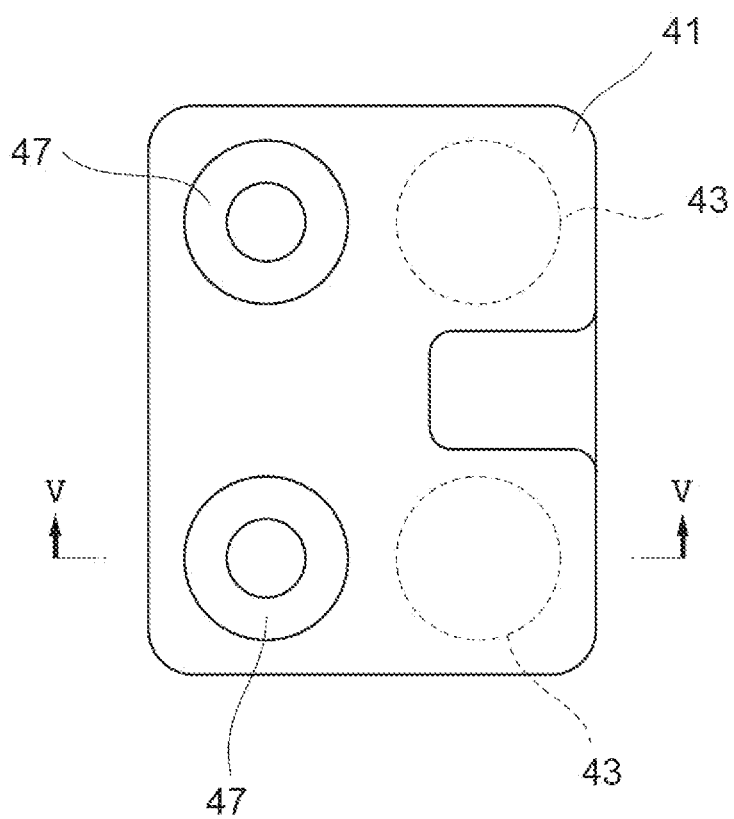
FIG. 4 is a plan view of a cover member.
Figure 5:
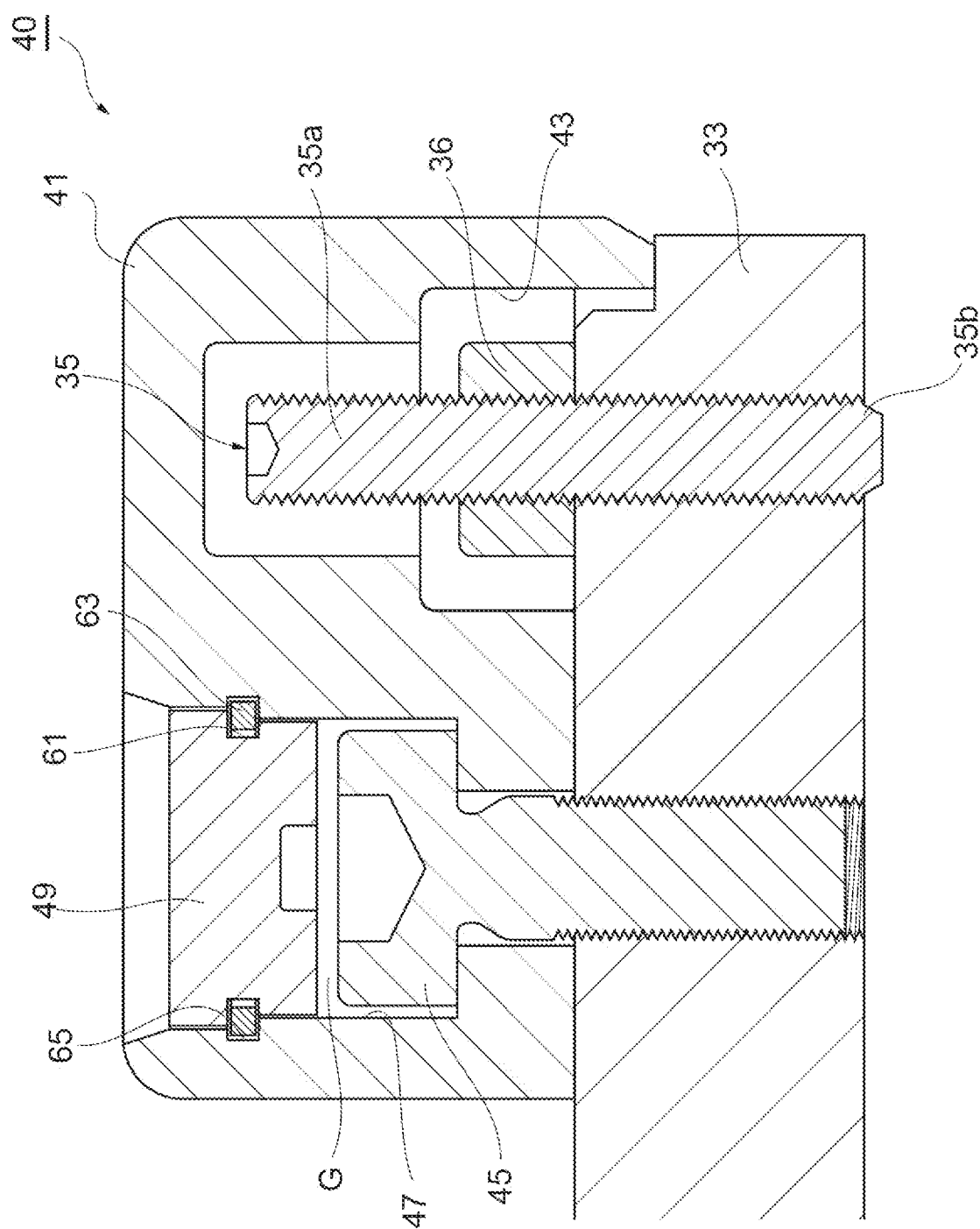
FIG. 5 is a cross-sectional view showing a falsification prevention structure of the example.

As shown in FIGS. 3 to 5, the falsification prevention structure 40 includes a cover member 41. The cover member 41 covers the two adjustment screw upper portions 35*a*. Two recesses 43 are formed on a lower surface of the cover member 41. Each of the recesses 43 accommodates one of the adjustment screw upper portions 35*a*. Each of the adjustment screw upper portions 35*a* is accommodated in a closed space surrounded by the cover member 41 and the flange portion 33. The cover member 41 is bolted (fastened) to an upper surface of the flange portion 33 by two fixing bolts 45 (fastening members). Two circular bolt holes 47 (fastening holes) which pass therethrough vertically are formed in the cover member 41. The fixing bolt 45 is inserted into each of the bolt holes 47. When the cover member 41 is bolted, heads of the fixing bolts 45 are accommodated in the bolt holes 47. As the fixing bolts 45, special bolts which require a special tool for attachment/detachment may be adopted.

Further, the falsification prevention structure 40 includes two circular caps 49 (lid members). Each of the caps 49 blocks one of the bolt holes 47 of the cover member 41. The caps 49 are inserted into and mounted in the bolt holes 47 in an axial direction of the bolt holes 47. Upper end surfaces of the mounted caps 49 are located lower than the surface of the cover member 41. The caps 49 are mounted above the fixing bolts 45 and are mounted with gaps G between the caps 49 and the heads of the fixing bolts 45. Although the details will be described later, the caps 49 are mounted in the bolt holes 47 by a retaining ring 63 in an irremovable state.

A material of the cover member 41 and the caps 49 is preferably formed to have a thick structure and is also preferably made of a metal to make them difficult to be destroyed. Further, a metal material having high hardness is preferably used as a material thereof to make the material of the cover member 41 and the caps 49 difficult to be destroyed. For example, a heat-resistant alloy such as stainless steel, carburized steel (blister steel, cement steel), or hard cast iron can be adopted as the material of the cover member 41. For example, high-strength alloy steel containing chromium or molybdenum such as chromium molybdenum steel can be adopted as the material of the cap 49. Further, the cap 49 is preferably made of a material which has been subjected to a hardening treatment to increase a surface hardness and to withstand breakage by an edged tool. Examples of the above-described hardening treatment include a carburizing treatment, a nitriding treatment, a thermal spray coating treatment (or a combination thereof) and the like. Further, high-speed steel or the like can be adopted as a material of the retaining ring 63. The falsification prevention structure 40 is required to have destructive resistance, such that it takes a predetermined time or longer to break it with, for example, an in-vehicle tool. The above-described predetermined time is, for example, set by laws and regulations of each country. The materials and dimensions of each of the above-described components are selected to meet these requirements. In particular, the caps 49 are preferably made of a material having a higher hardness than that of the cover member 41.

An arrangement structure of the caps 49 to the cover member 41 will be described with reference to FIG. 6. In the following description, the terms "axial direction," "radial direction," and "circumferential direction" simply mean an axial direction, a radial direction, and a circumferential direction, respectively, of the bolt hole 47.

Figure 6:
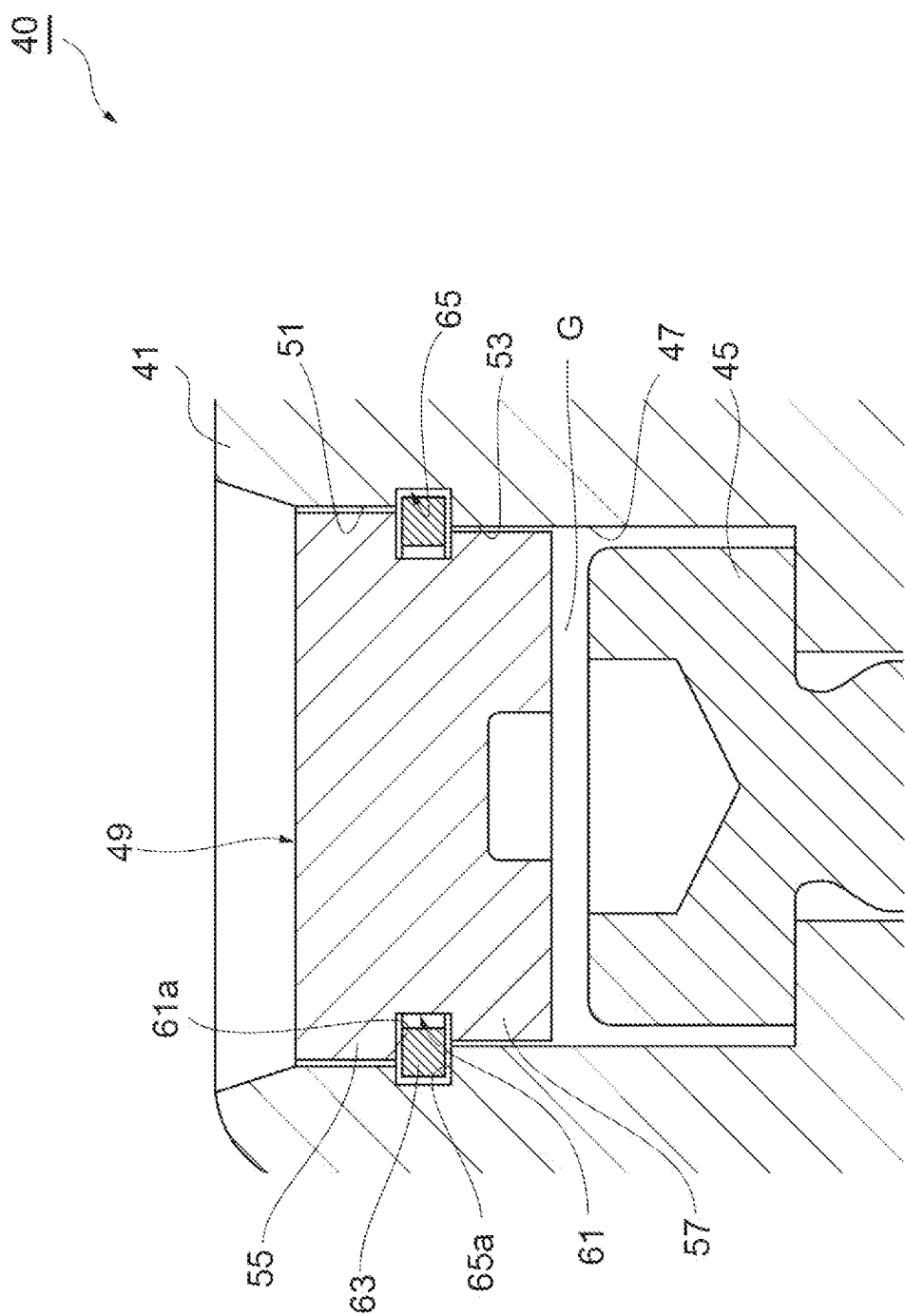
FIG. 6 is an enlarged cross-sectional view showing a part of the falsification prevention structure of the example.

As shown in FIG. 6, the bolt hole 47 has a large-diameter hole portion 51 located at an upper portion (a side of an inlet) thereof and a small-diameter hole portion 53 located deeper than the large-diameter hole portion 51 and formed to have a smaller diameter than the large-diameter hole portion 51. Correspondingly, the cap 49 has a large-diameter body portion 55 inserted into the large-diameter hole portion 51 and a small-diameter body portion 57 inserted into the small-diameter hole portion 53 and formed to have a smaller diameter than the large-diameter body portion 55. Since an outer diameter of the large-diameter body portion 55 is larger than an inner diameter of the small-diameter hole portion 53, an error of mounting the cap 49 upside down in the bolt hole 47 is avoided.

Further, the cap 49 has a ring mounting groove 61 which extends in the circumferential direction at a boundary between the large-diameter body portion 55 and the small-diameter body portion 57. The C-shaped retaining ring 63 is fitted into the ring mounting groove 61. An outer diameter of the retaining ring 63 is larger than an inner diameter of the large-diameter hole portion 51. A ring fitting groove 65 which extends in the circumferential direction is formed in an inner wall of the bolt hole 47 at a boundary between the large-diameter hole portion 51 and the small-diameter hole portion 53. When the retaining ring 63 is mounted in the ring mounting groove 61 and the retaining ring 63 is inserted in the axial direction from the side of the small-diameter body portion 57, the retaining ring 63 extremely expanding and thus the retaining ring 63 losing elasticity can be avoided.

In the case in which the cap 49 is mounted and the cap 49 is pushed into the bolt hole 47 in the axial direction of the bolt hole 47, when the retaining ring 63 compressed in the radial direction by the large-diameter hole portion 51 reaches the ring fitting groove 65, the retaining ring 63 expands in the radial direction again, and the retaining ring 63 fits into the ring fitting groove 65. Then, the retaining ring 63 is inserted into both the ring mounting groove 61 and the ring fitting groove 65. Movement of the cap 49 in this state in the axial direction is greatly restricted. That is, the cap 49 can be moved only in a small gap between the retaining ring 63 and the ring mounting groove 61, or in a small gap between the retaining ring 63 and the ring fitting groove 65 and cannot be moved any further. That is, the cap 49 is pressure-fitted and cannot be removed from the cover member 41.

As described above, the cap 49 is mounted in the cover member 41 with an irremovable mounting structure. Further, the cap 49 can rotate in the circumferential direction in the bolt hole 47 because a clearance (gap) between the cap 49 and the bolt hole 47 is present appropriately. Here, the above-described "irremovable (tamper-proof)" state is a state in which the cap 49 cannot be removed from the cover member 41 unless the following (1) or (2) is performed.

(1) At least a part of the falsification prevention structure 40 (for example, the cap 49, the cover member 41, or the retaining ring 63) is destroyed.

(2) A special tool or a special method is used.

That is, the "irremovable" state does not exclude the state in which the cap 49 can be removed by at least a part of the falsification prevention structure 40 being destroyed, and also does not exclude the state in which the cap 49 can be removed by a special tool or a special method. In the above-described "special method," a method in which the falsification prevention structure 40 is heated, a method in which the falsification prevention structure 40 is vibrated, a method in which a lubricant, a corrosive agent, or the like is infiltrated between the cap 49 and the cover member 41, to make the cap 49 easy to remove are included.

An operation and an effect of the turbocharger 1 with the falsification prevention structure 40 as described above will be described. At the time of manufacturing the turbocharger 1, a final adjustment of the turbine flow rate is performed by operating the adjustment screw upper portion 35a. Then, the cover member 41 is put on the adjustment screw upper portion 35a, and the cover member 41 is bolted to the flange portion 33 by the fixing bolt 45. Therefore, the adjustment screw upper portion 35a cannot be manipulated to be rotated. Further, since the bolt hole 47 is blocked by the cap 49 from above the fixing bolt 45 and the cap 49 cannot be removed from the cover member 41, the cover member 41 cannot be removed by loosening the fixing bolt 45. Therefore, after the cover member 41 and the cap 49 are mounted, it is extremely difficult to access the adjustment screw upper portion 35a, and a possibility of falsification of the turbine flow rate by the user or the like is reduced.

At first glance, it may seem that the turbine flow rate can be falsified by altering a portion located below the flange portion 33 (for example, the adjustment screw lower portion 35b). However, in a state in which the turbocharger 1 is assembled to an internal combustion engine, it is difficult for the hands of the user or the like to reach below the flange portion 33, and thus it is difficult for the user or the like to perform the above-described alteration.

Further, the cap 49 is mounted in a state in which it is rotatable with respect to the cover member 41. With such a configuration, when the cap 49 is attempted to be destroyed by a rotating tool, the cap 49 easily rotates following the rotating tool. Therefore, it is difficult for the cap 49 to be cut or ground by a blade of the rotating tool. Therefore, it is difficult to destroy the cap 49 with the rotating tool. Here, the "state in which the cap 49 is rotatable" is not limited to a case in which the cap 49 is completely rotatable with respect to the cover member 41. The "state in which the cap 49 is rotatable" may be a state in which the cap 49 rotates following the rotating tool when the blade of the rotating tool is pressed against the cap 49. Therefore, as long as the cap 49 rotates following the rotating tool, a state in which the cap 49 is fixed to the cover member 41 with a relatively small fixing force is also included in the "state in which the cap 49 is rotatable".

As described above, in the falsification prevention structure 40, the bolt hole 47 has the large-diameter hole portion 51 on the side of the inlet and the small-diameter hole portion 53 on the inner side, and the cap 49 correspondingly has the large-diameter body portion 55 and the small-diameter body portion 57. Additionally, the ring fitting groove 65 of the bolt hole 47 is provided at the boundary between the large-diameter hole portion 51 and the small-diameter hole portion 53, and the ring mounting groove 61 of the cap 49 is provided at the boundary between the large-diameter body portion 55 and the small-diameter body portion 57. Here, as shown in FIG. 7, it is hypothetically assumed that the bolt hole 47 and the cap 49 have a simple cylindrical shape. In this structure, when an attempt is made to destroy the cap 49 by hitting from above, at the time of hitting, a shearing force mainly acts on the retaining ring 63 due to a relative displacement of the ring mounting groove 61 and the ring fitting groove 65 in the vertical direction.

On the other hand, in the falsification prevention structure 40 shown in FIG. 6, when the cap 49 is hit from above, the retaining ring 63 is sandwiched in the vertical direction at a portion in which an upper surface 61a of the ring mounting groove 61 and a lower surface 65a of the ring fitting groove 65 face each other, and a compressive force in the vertical direction mainly acts on the retaining ring 63. Therefore, the retaining ring 63 is less likely to be destroyed as compared with the case in which it receives a shearing force, and as a result, it is also difficult to remove the cap 49 by hitting. Further, even if the retaining ring 63 is destroyed, the large-diameter body portion 55 of the cap 49 is caught by the lower surface 65a of the ring fitting groove 65, and the cap 49 is prevented from moving downward.

Further, the ring mounting groove 61 of the cap 49 is provided at the boundary between the large-diameter body portion 55 and the small-diameter body portion 57. With such a configuration, the ring mounting groove 61 and the like are efficiently disposed in the vertical direction as compared with a case in which the ring mounting groove 61 is provided in another portion (for example, the small-diameter body portion 57), and a vertical width of the entire cap 49 can be reduced. Therefore, the falsification prevention structure 40 can be miniaturized.

Further, in the falsification prevention structure 40, there is a gap G between the cap 49 and the fixing bolt 45. Thus, when the cap 49 is hit from above, the hitting force is prevented from being directly transmitted to the fixing bolt 45. When the hitting force is transmitted to the fixing bolt 45, the thread groove of the fixing bolt 45 and the flange portion 33 may be destroyed, there is a possibility in which the cover member 41 may remove from the flange portion 33, and the possibility is reduced by the presence of the gap G. Further, when the cap 49 and the fixing bolt 45 are hypothetically in contact with each other, noise due to vibration of the turbocharger 1 during an operation is caused, but the presence of the gap G reduces the noise.

Further, the cap 49 is mounted in the cover member 41 by a method using the retaining ring 63. Therefore, it is possible to manually mount the cap 49 without using any mechanisms or tools at the time of manufacturing.

The turbocharger 1 of the above-described example can be implemented in various forms with various changes and improvements based on the knowledge of those skilled in the art. Further, it is also possible to configure the following modified example using the technical matters described in the above-described example. The configurations of the respective examples may be appropriately combined and used.

Figure 8A:
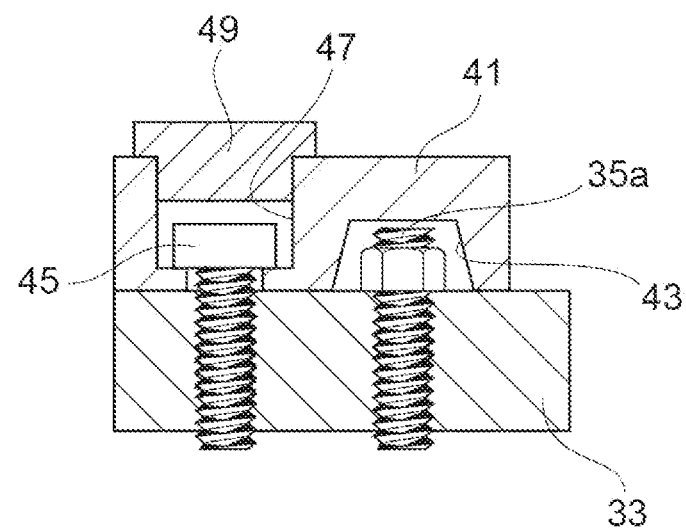
FIGS. 8A to 8C are cross-sectional views showing modified examples of the falsification prevention structure.
Figure 8B:
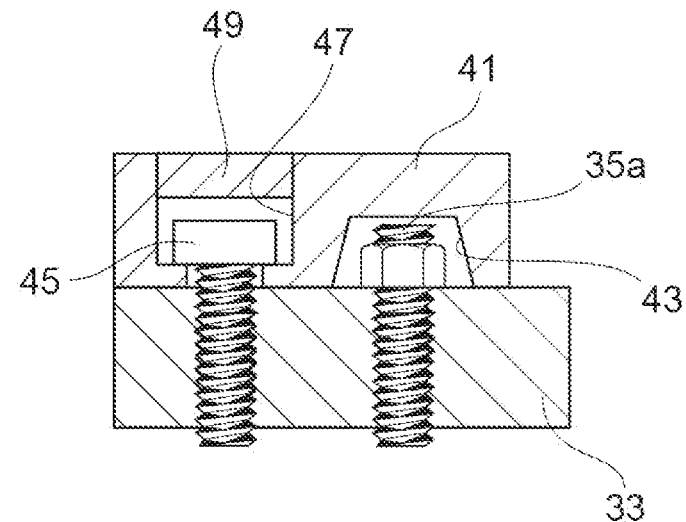

As shown in FIG. 8A, the cap 49 may be welded to the cover member 41 instead of the mounting method using the retaining ring 63. Further, it is not essential that the entire cap 49 is inserted into the bolt hole 47, and a part of a tip end of the cap 49 may be inserted into the bolt hole 47 as shown in FIG. 8A. Further, as shown in FIG. 8B, the cap 49 may be press-fitted into the bolt hole 47 of the cover member 41.

Figure 8C:
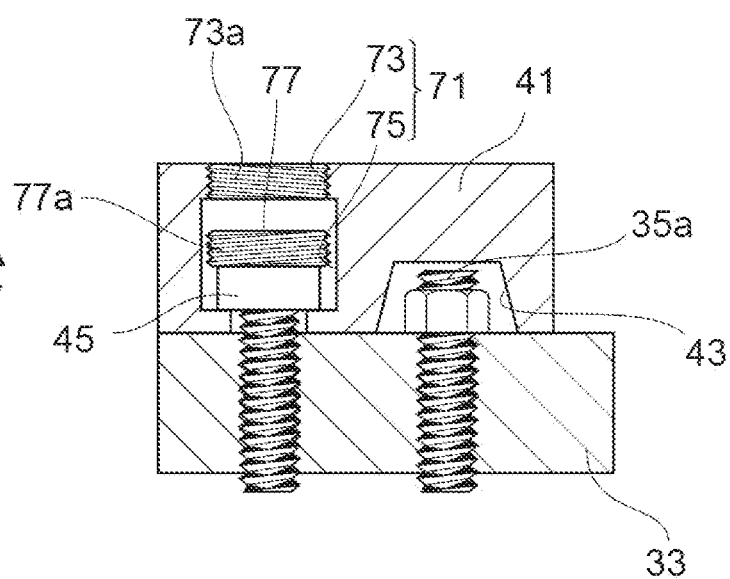

Moreover, a structure as shown in FIG. 8C may be adopted. In the configuration of FIG. 8C, the bolt hole 71 has a small-diameter portion 73 on the side of an inlet and a large-diameter portion 75 on the inner side. A female screw portion 73a is formed on an inner peripheral surface of the small diameter portion 73, and a male screw portion 77a is formed on an outer peripheral surface of the cap 77. A vertical width from an upper end of the large-diameter portion 75 to an upper end of the fixing bolt 45 is wider than the vertical width of the cap 77. In the work in which the bolt hole 71 is blocked by the cap 77, the cap 77 is screwed into the small-diameter portion 73 and rotated, and thus the cap 77 penetrates into the inner side of the bolt hole 71. Finally, the male screw portion 77a falls off from the female screw portion 73a, and the cap 77 falls into the large-diameter portion 75. At this time, the cap 77 rattles in the radial direction and the axial direction in the large-diameter portion 75. Therefore, the cap 77 is difficult to be separated from the bolt hole 71 and thus is in the irremovable state. Further, when the rattling in the large-diameter portion 75 in the radial direction and the axial direction is set small, the bolt hole 71 can be blocked in a state in which the cap 77 is rotatable in the circumferential direction.

Further, a rivet may be used instead of the fixing bolt 45 which fastens the cover member 41 to the flange portion 33. Further, the cover member 41 and the flange portion 33 may be joined by a pin press-fitted into the cover member 41 and the flange portion 33. Further, the cover member 41 of the example accommodates the adjustment screw upper portion 35a in the recess 43 and completely hides it. However, the current disclosure is not limited to this mode, as long as the cover member 41 hinders the operation of the adjustment screw upper portion 35a (for example, insertion or operation of an operating tool is hindered), it is not essential to completely hide the adjustment screw upper portion 35a. Further, in the example, although there are two flow rate adjustment screws 35, one flow rate adjustment screw 35 may be provided, and in this case, the cover member 41 may have one recess 43.

Further, the cap 49 of the example closes almost the entire cross section of the bolt hole 47. However, the current disclosure is not limited to this mode, as long as the cap 49 hinders the attachment/detachment operation of the fixing bolt 45 (for example, the insertion/operation of the attachment/detachment tool is hindered), it is not essential to close almost the entire cross section of the bolt hole 47. Further, the configuration of the falsification prevention structure 40 is not limited to the falsification prevention of the turbine flow rate, and can be applied to the falsification prevention of other performances (for example, a compressor flow rate) of the turbocharger 1.

(Reference form)

Figure 9:
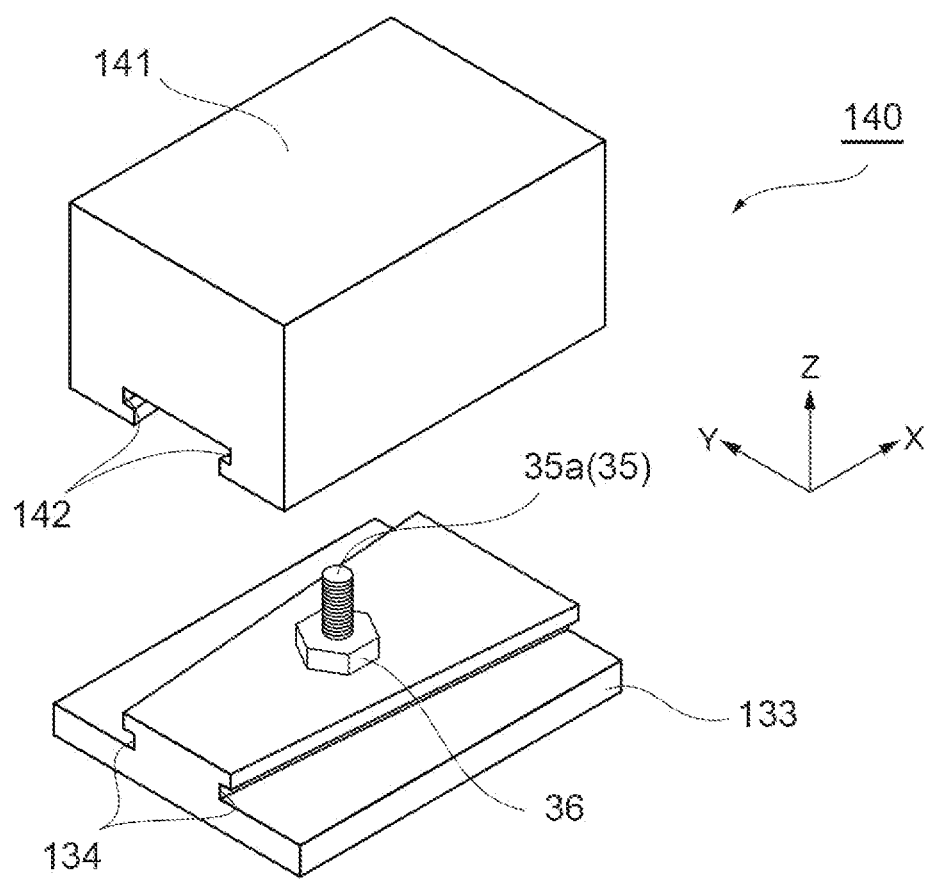
FIG. 9 is a cross-sectional view showing a reference form of another falsification prevention structure.
Figure 10A:
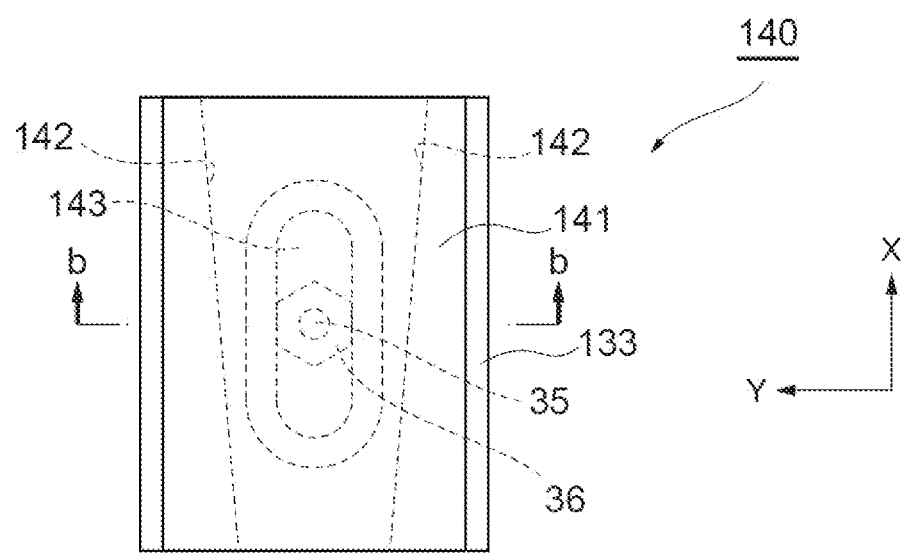
FIG. 10A is a plan view of the falsification prevention structure of FIG. 9.

As the falsification prevention structure which covers the adjustment screw upper portion 35a with the cover member, the falsification prevention structure 140 shown in FIGS. 9 and 10 can also be considered. In the following description, an X direction, a Y direction, and a Z direction shown in FIGS. 9 and 10 may be used for the description. In the falsification prevention structure 140, only one flow rate adjustment screw 35 is mounted in the flange portion 133. A pair of fitting portions 134 which sandwich the adjustment screw upper portion 35a in the Y direction are provided on the upper surface of the flange portion 133. The two fitting portions 134 extend in a direction inclined with respect to the X direction. A distance between the two fitting portions 134 in the Y direction becomes wider toward a +X direction.

Figure 10B:
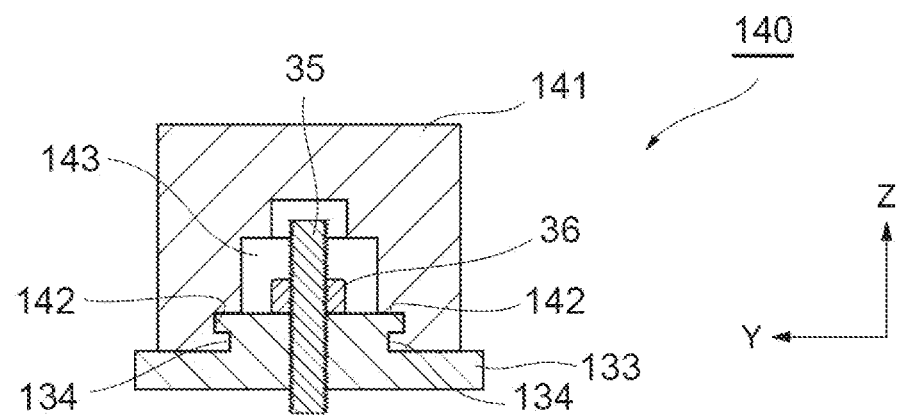
FIG. 10B is a cross-sectional view along line b-b.

A recess 143 which accommodates the adjustment screw upper portion 35a and the nut 36 is formed in a bottom surface of the cover member 141. The recess 143 has an elongated hole shape which is long in the X direction. Further, a pair of fitting portions 142 having a shape to be fitted into the fitting portion 134 are provided in the bottom surface of the cover member 141. The two fitting portions 142 are disposed to sandwich the recess 143 in the Y direction and are inclined with respect to the X direction at the same inclination angle as that of the corresponding fitting portions 134. As shown in FIG. 10B, the cover member 141 is fixed to the flange portion 133 by fitting the fitting portion 142 and the fitting portion 134 with almost no gap.

When the cover member 141 is mounted on the flange portion 133, the cover member 141 is covered so that the adjustment screw upper portion 35a and the nut 36 are accommodated in the recess 143 in a positional relationship in which the cover member 141 is misaligned with respect to the flange portion 133 in a −X direction. Then, the fitting portion 142 and the fitting portion 134 are fitted, and the cover member 141 is fixed to the flange portion 133 by sliding the cover member 141 in the +X direction. After that, the cover member 141 and the flange portion 133 may be joined by welding or the like.

The invention claimed is:

1. An apparatus for preventing performance falsification of a turbocharger, the apparatus comprising:
   a main body;
   an adjuster which is mounted on the main body and configured to adjust the performance of the turbocharger;
   a cover member which is fastened to the main body by a fastener through a fastening hole on the cover member, and houses at least a portion of the adjuster; and
   a lid which is mounted on the cover member in a tamper-proof manner and closes the fastening hole.

2. The apparatus according to claim 1, wherein the lid is disposed with a gap between the fastening hole so as to be rotatably mounted with respect to the cover member.

3. The apparatus according to claim 1, wherein the lid is disposed with a gap between the fastener.

4. The apparatus according to claim 1, wherein the lid is made of a material which has been subjected to a hardening treatment.

5. The apparatus according to claim 1, wherein the lid is made of a first material having a higher hardness than a second material of the cover member.

6. The apparatus according to claim 1, wherein at least a part of the lid is inserted into the fastening hole in an axial direction of the fastening hole.

7. The apparatus according to claim 1, wherein the lid is completely inserted into the fastening hole in an axial direction of the lid.

8. The apparatus according to claim 1, wherein an upper end surface of the lid which is inserted into the fastening hole is located lower than a surface of the cover member.

9. The apparatus according to claim 1, wherein an upper end surface of the lid which is inserted into the fastening hole is located higher than a surface of the cover member.

10. The apparatus according to claim 1, wherein the adjuster is a screw for adjusting the performance of the turbocharger.

11. The apparatus according to claim 1, wherein the adjuster is a rivet for adjusting the performance of the turbocharger.

12. The apparatus according to claim 1, wherein the adjuster is a pin for adjusting the performance of the turbocharger.

13. The apparatus according to claim 1, wherein the adjuster is configured to adjust a turbine flow rate of the turbocharger.

14. The apparatus according to claim 1, wherein the adjuster is configured to adjust a compressor flow rate of the turbocharger.

15. The apparatus according to claim 1, further comprising a retaining ring which is disposed between the lid and the fastening hole and configured to pressure-fit the lid in the fastening hole.

16. The apparatus according to claim 15, wherein the retaining ring is C-shaped.

17. The apparatus according to claim 15,
   wherein the lid comprises a ring mounting groove on an outer surface which extends in a circumferential direction of the lid,
   wherein the fastening hole comprises a ring fitting groove on an inner wall of the fastening hole in the circumferential direction, and
   wherein the retaining ring is disposed in the ring mounting groove and the ring fitting groove so as to pressure-fit the lid in the fastening hole.

18. The apparatus according to claim 17,
   wherein the fastening hole comprises:
      a large-diameter hole portion located on a side of an inlet into which the fastener is inserted;
      a small-diameter hole portion which is located closer to the fastener than the large-diameter hole portion and has a smaller diameter than the large-diameter hole portion, wherein the ring fitting groove is formed at a boundary between the large-diameter hole portion and the small-diameter hole portion, and wherein the lid comprises:
a large-diameter body portion which is inserted into the large-diameter hole portion;
a small-diameter body portion which is inserted into the small-diameter hole portion and has a smaller diameter than the large-diameter body portion, and wherein a ring mounting groove is formed at a boundary between the large-diameter body portion and the small-diameter body portion.

19. The apparatus according to claim 18, wherein an outer diameter of the retaining ring is larger than an inner diameter of the large-diameter hole portion.

20. A method of manufacturing an apparatus for preventing performance falsification of a turbocharger, the method comprising:
mounting an adjuster on a main body, wherein the adjuster is configured to adjust the performance of the turbocharger;
fastening a cover member to the main body by a fastener through a fastening hole on the cover member, wherein the cover member houses at least a portion of the adjuster; and
mounting a lid on the cover member in a tamper-proof manner, wherein the lid closes the fastening hole.

* * * * *